Aug. 29, 1939.  J. LYON  2,171,400
AIR FILTER AND MEDICATOR FOR POULTRY HOVERS AND THE LIKE
Filed July 7, 1937
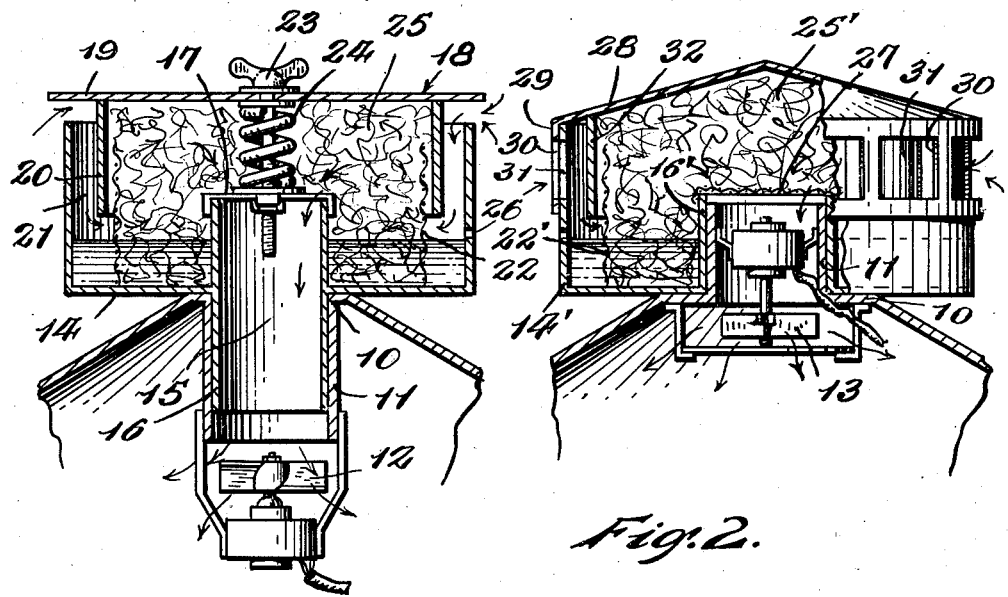
INVENTOR:
JAMES LYON,
BY:
Christian R. Nielsen
ATTORNEY Patented Aug. 29, 1939

2,171,400

UNITED STATES PATENT OFFICE 2,171,400

AIR FILTER AND MEDICATOR FOR POULTRY HOVERS AND THE LIKE

James Lyon, San Diego, Calif.

Application July 7, 1937, Serial No. 152,405

5 Claims. (Cl. 21—74)

This invention relates to an air filter for poultry brooders and the like and it consists in the constructions, arrangements and combinations herein described and claimed.

It is an object of the invention to provide a filter device of such construction as to be readily installed in the air inlet or vent of a hover brooder.

It is also an object of the invention to provide a novel filter of a portable construction embodying filter material and a reservoir for medicines so that the air passing into the hover will not only be cleaned of dust, but will be impregnated with vapors from the medicine.

It is a still further object of the invention to provide a filter of the character stated in which the amount of air passing into the hover may be regulated.

Additional objects, advantages and features of invention will be apparent from the following description and accompanying drawing, in which Figure 1 is a vertical sectional view of my filter installed in the air inlet of a hover brooder, Figure 2 is a similar view partly in section, of a modified form of the filter, Figure 3 is an elevation of another form of the device, partly in section, Figure 4 is a similar view of a still further form of filter.

At present, ventilation of brooders is accomplished by the use of rotary impellers, forcing or drawing air from the exterior to the interior of the brooder, and it has been found that the air thus delivered to the brooder contains a great deal of dust and foreign matter injurious to the health of the chicks.

The air intake is ordinarily at the apex of the roof of the brooder, as shown at 10, which includes a downwardly directed chimney 11, as indicated in Figures 1, 3 and 4, or an upstanding chimney, as shown in Figure 2.

The impeller may be positioned in the chimney 11 so as to draw the air inwardly as at 12 (Figure 1) or blow the air into the brooder as indicated at 13 in Figure 2.

Attention is first invited to Figure 1 of the drawing, wherein the filter 14 is shown as a cylindrical drum having an axial aperture 15 defined by a collar 16. The collar 16 extends upwardly in the drum 14 for a short distance and downwardly below the bottom wall of the drum, the latter having snug seating engagement in the chimney 11, so that the filter will be firmly retained against accidental dislodgement.

Upon the upper end of the collar 16 there is secured a spider 17 for support of a combined closure and valve 18, as will be described. The combined closure and valve, in the present instances, consists of a circular cover member 19, of a diameter slightly greater than that of the drum and upon the under face there is provided a collar 20 of a depth slightly more than one half the depth of the drum 14 and of a diameter considerably less than the diameter of the drum 14. Thus the collar 20 lies spaced inwardly and concentric with the wall of the drum, as shown at 21.

A wire screen filter retainer 22 is secured upon the bottom wall of the drum 14, disposed vertically and of annular form and of a diameter to permit ready passage of the collar 20 therearound.

The cover member 19 has a wing bolt 23 revolubly mounted through its axial center, the lower end being screw threaded for engagement with a threaded aperture in the spider 17. A helical spring 24 is mounted upon the bolt 23, interposed between the cover plate 19 and the spider 17, the spring acting to maintain the cover plate in adjusted position with respect to the upper edge of the drum, thereby regulating the amount of air passing into the drum.

Any suitable filter material 25 may be placed in the retainer 22, and the drum may be provided with any desired medicament with which it is desired to treat the chicks housed in the hover, or it may be any substance which might tend to purify the air to be discharged into the hover. An overflow vent 26 is formed in the wall of the drum at any suitable height.

The operation will be clearly apparent, but briefly stated, the cover 19 will be adjusted to regulate the amount of air entering the drum, by means of the screw 23, the passage of air being indicated by arrows, drawn thus, by operation of the impeller 12. It will be apparent that the air will be brought into contact with medicament and drawn through the filter material and finally will pass downwardly through the chimney 16 and discharge into the hover. Obviously, the degree of medicated air may be regulated by adjustment of the collar 20 with respect to the level of the medicament.

Reference is now made to Figure 2, wherein the chimney 11 is upwardly directed and upon which the collar 16' of the drum 14' is fitted. The upper end of the collar 16' has a screen 27 fitted thereto permitting passage of air through the chimney due to suction created by the impeller 13.

An annular retainer screen 22' is provided, as before described, to confine the filter material 25'. A conically shaped cover 28 of a size to snugly engage upon the periphery of the drum is provided, the downwardly extended flange 29 being provided with a plurality of circumferentially spaced apertures 30. These apertures are cooperable with apertures 31 formed in the wall of the drum 14' and by rotating the cover, the degree of opening between the registering apertures may be varied, thereby regulating the amount of air passing into the drum.

In order that the air may be caused to engage the medicament in the drum, a downwardly disposed annular flange 32 is fixed to the underside of the cover 28, the flange 32 being suitably spaced from the wall of the drum to permit proper flow of air.

In Figure 3, a simplified form of filter is shown, in which the structure comprises a rectangular box having a collar 16a of a size to snugly engage within the chimney 11a. The box has a filler opening 33 for the purpose of filling the box with a medicine or oil, as desired; an overflow opening 34 and any suitable number of rotary air control valves 35 may be installed in the side walls of the box. In the present instance, the valves 35 consist of a rotary disk apertured as at 36 cooperable with apertures 37 formed in the wall of the box.

In Figure 4, a cartridge form of the filter is shown at 38, of a diameter to snugly fit within the chimney 11. The wall of the cartridge at opposite sides, is provided with a plurality of vertically spaced apertures 39, and the upper end of the cartridge is flanged as at 40 for receiving a cap 41, the cap being apertured as at 42 for admission of air therethrough, as will be explained hereinafter.

A wire cage member 43 is provided of a diameter to firmly engage within the cartridge, the cage enclosing a filter material 44. The filter material may be impregnated with the desired medicament or oil, and obviously, the supply may be replenished by injection through the apertures 39 and 42, if and when found necessary.

The regulation of the air, in this form is accomplished by vertical adjustment of the cartridge within the chimney, thereby increasing or decreasing the number of apertures 39 exposed to the atmosphere.

From the foregoing, it will be seen that I have provided portable filter devices which may be readily installed and removed from hovers for cleaning, and which in use, insures entrance of purified or medicated air to the chicks, and in no wise interfere with proper ventilation of the hover.

If desired, any conventional heating means may be employed to vaporize the medicament.

While I have shown and described preferred forms of the filter, this is by way of illustration only, and I consider as my own, all such modifications in structure, as fairly fall within the scope of the appended claims.

I claim:

1. An air purifying and medicating device for hovers comprising a receptacle and having means for connection with the air entrance passage of a hover, an upstanding collar within the receptacle defining a passage into the hover, the collar extending above the level of a medicament within the receptacle, a filter material within the receptacle and disposed above and around the collar, a cover for the receptacle adjustable with respect thereto to regulate the passage of air into the receptacle, and means for effecting passage of air through the medicament, filter material and the air entrance passage.

2. An air purifying and medicating device for hovers comprising a receptacle and having means for connection with the air entrance passage of a hover, an upstanding collar within the receptacle defining a passageway into the hover, the collar extending above the level of a medicament within the receptacle, a filter material within the receptacle and disposed above and around the collar, a cover for the receptacle adjustable with respect thereto to regulate the passage of air into the receptacle, an annular depending collar on the cover, spaced from the wall of the receptacle, and means for effecting passage of air through the medicament, filter material and the air entrance passage.

3. A portable air medicating and purifying device comprising a drum having a collar extended upon opposite sides of the bottom wall thereof, defining a passage-way, an annular screen filter retainer member in the drum, a filter material confined by the screen, a cover member for the drum, an annular flange on the cover depending into the drum and spaced from the wall thereof, and said cover being adjustable with respect to the drum to define an adjustable air passage-way.

4. A portable air medicating and purifying device comprising a drum having a collar extended upon opposite sides of the bottom wall thereof, defining a passage-way, an annular screen filter retainer member in the drum, a filter material confined by the screen, a cover member for the drum, an annular flange on the cover depending into the drum and spaced from the wall thereof, a spider on the inner end of the collar, a bolt revolubly mounted in the cover having threaded engagement with an aperture of the spider, and a helical spring on the bolt interposed between the spider and the cover.

5. An air purifying and medicating device for hovers comprising a receptacle having means for connection with an air entrance passage of a hover, an upstanding collar within the receptacle, the collar extending above the level of a medicament within the receptacle, a filter material within the receptacle disposed above and around the collar, and means for controlling passage of air into the receptacle.

JAMES LYON.